United States Patent
He et al.

(10) Patent No.: US 10,491,291 B2
(45) Date of Patent: Nov. 26, 2019

(54) SYSTEM AND METHOD FOR MULTI-CHANNEL VEHICLE COMMUNICATIONS

(71) Applicant: Honeywell International Inc., Morris Plains, NJ (US)

(72) Inventors: Xiaozhong He, Laurel, MD (US); Thomas D. Judd, Woodinville, WA (US); Alfonso Malaga, Sammamish, WA (US); Adam Moya, Chandler, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/600,249

(22) Filed: May 19, 2017

(65) Prior Publication Data

US 2018/0337720 A1  Nov. 22, 2018

(51) Int. Cl.
| | | |
|---|---|---|
| *H04W 4/00* | (2018.01) | |
| *H04B 7/185* | (2006.01) | |
| *G07C 5/00* | (2006.01) | |
| *H04L 29/06* | (2006.01) | |
| *G08G 5/00* | (2006.01) | |
| *H04B 1/3822* | (2015.01) | |

(Continued)

(52) U.S. Cl.
CPC ......... *H04B 7/18506* (2013.01); *G07C 5/008* (2013.01); *G08G 5/0013* (2013.01); *H04B 1/38* (2013.01); *H04B 1/3822* (2013.01); *H04L 69/18* (2013.01); *H04W 84/06* (2013.01)

(58) Field of Classification Search
CPC . H04B 7/18506; H04B 1/3822; H04W 84/06; H04L 69/18; G07C 5/008; G08G 5/0013
See application file for complete search history.

(56) References Cited

U.S. PATENT DOCUMENTS

| | | | |
|---|---|---|---|
| 6,567,395 B1 * | 5/2003 | Miller | ............... H04B 7/18502 370/345 |
| 7,894,779 B2 | 2/2011 | Meiyappan et al. | |
| 8,923,167 B2 | 12/2014 | Black et al. | |

(Continued)

FOREIGN PATENT DOCUMENTS

| | | |
|---|---|---|
| CA | 2492683 A1 | 11/2003 |
| EP | 2129006 A2 | 12/2009 |

(Continued)

OTHER PUBLICATIONS

Lieberei et al., "MIMO Wireless Communication in an Aircraft Using Omnidirectional and Leaky Line Antennas", "Workshop on Aviation System Technology", Mar. 26-27, 2009, pp. 1-10, Publisher: AST 2009, Published in: Hamburg, Germany.

(Continued)

*Primary Examiner* — Clemence S Han
(74) *Attorney, Agent, or Firm* — Fogg & Powers LLC (57) ABSTRACT

In one embodiment, a method is provided. The method comprises: selecting, with a communications management system configured to be installed on a vehicle, at least one primary channel on a multichannel transceiver; transmitting and/or receiving data over the at least one primary channel; searching, with the multichannel transceiver for other viable communications links; and selecting a new at least one primary channel.

20 Claims, 4 Drawing Sheets

(51) Int. Cl.
*H04W 84/06* (2009.01)
*H04B 1/38* (2015.01)

(56) References Cited

U.S. PATENT DOCUMENTS

| | | | |
|---|---|---|---|
| 9,094,087 B2 | 7/2015 | Malaga | |
| 9,285,472 B2 | 3/2016 | Getson et al. | |
| 9,493,132 B2 | 11/2016 | Kawada et al. | |
| 2003/0203734 A1* | 10/2003 | Igloi | G06F 8/60 455/431 |
| 2006/0046715 A1 | 3/2006 | Burgemeister | |
| 2008/0084861 A1 | 4/2008 | Hunter | |
| 2008/0266166 A1* | 10/2008 | Schuchman | G07C 5/008 342/37 |
| 2009/0298451 A1* | 12/2009 | Malaga | H04B 1/40 455/129 |
| 2011/0255506 A1 | 10/2011 | Toth et al. | |
| 2014/0003335 A1* | 1/2014 | Roy | H04L 69/14 370/328 |
| 2015/0118983 A1* | 4/2015 | Malaga | H04B 1/1638 455/179.1 |
| 2015/0215899 A1* | 7/2015 | Kumar | H04W 72/02 455/59 |
| 2015/0263781 A1 | 9/2015 | Pelleschi | |
| 2016/0344467 A1* | 11/2016 | Shelton | H04B 7/18506 |
| 2017/0054490 A1* | 2/2017 | Zeng | H04B 7/18506 |
| 2017/0257320 A1* | 9/2017 | Bolling | H04L 47/12 |

FOREIGN PATENT DOCUMENTS

| | | |
|---|---|---|
| EP | 2876815 A2 | 5/2015 |
| EP | 2899943 A1 | 7/2015 |

OTHER PUBLICATIONS

Zhang et al., "Aeronautical Virtual MIMO Communications with Terrestrial Linear Array Antenna", "2013 International Conference on Mechatronic Sciences, Electroc Engineering and Computer (MEC)", Dec. 20-22, 2013, pp. 3089-3093, Publisher: IEEE, Published in: Shenyang, China.

European Patent Office, "Extended European Search Report from EP Application No. 18171724.0 dated Oct. 15, 2018", from Foreign Counterpart to U.S. Appl. No. 15/600,249, filed Oct. 15, 2018, pp. 1-11, Published: US.

* cited by examiner

SYSTEM AND METHOD FOR MULTI-CHANNEL VEHICLE COMMUNICATIONS

BACKGROUND

Modern aircraft include three VHF data radios each of which is capable of receiving only a single channel at any time. Two of the radios are dedicated for voice communications and one radio is dedicated to a single channel for data communications. Many such aircraft do not have the capability to add an additional data radio and antenna(s) to support operation of a second data channel. This may arise due to cost, lack of space for the radio, the undesirability of having too many holes in the aircraft body (e.g. to mount additional antenna(s)), drag caused by the additional antenna(s), and interference by having proximate antennas. As a result, all VHF data traffic, such as messages from air traffic controllers and airline operations centers must be conveyed through the single VHF data channel. This is not always feasible or desirable. Therefore, there is a need to provide more robust data communications without increasing the number of radios and antennas on an aircraft.

SUMMARY

In one embodiment, a method is provided. The method comprises: selecting, with a communications management system configured to be installed on a vehicle, at least one primary channel on a multichannel transceiver; transmitting and/or receiving data over the at least one primary channel; searching, with the multichannel transceiver for other viable communications links; and selecting a new at least one primary channel.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

For pedagogical purposes, a vehicle may be described hereinafter as an aircraft. However, it is understood that the teachings herein are applicable to other types of vehicles including without limitation space craft, ships, automobiles, buses, trains, and any other vehicle. Thus, a pilot of an aircraft is more generically referred to as an operator of a vehicle 101. An airline is more generically referred to as an owner of a vehicle. A flight plan of an aircraft is more generically referred to as a travel path of the vehicle.

Figure 1:
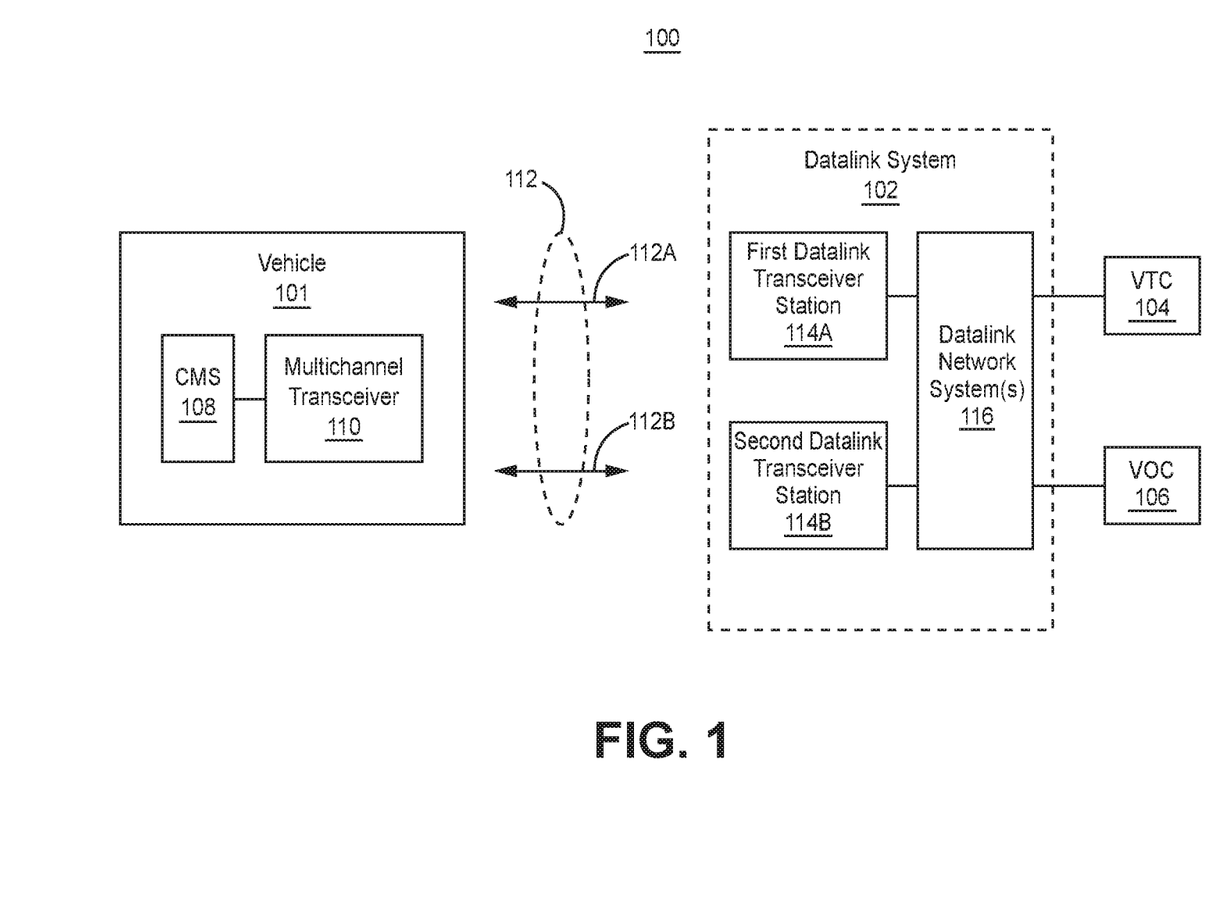
FIG. 1 illustrates one embodiment of a multichannel vehicle communications system.

FIG. 1 illustrates one embodiment of a multichannel vehicle communications system 100. The multichannel vehicle communications system 100 is configured to simultaneously receive communications in two or more channels, e.g. corresponding to two or more communications links. In another embodiment, the multichannel vehicle communications system 100 is also configured to transmit over a single channel, e.g. one communications link, at any time while simultaneously receiving one or more channels. Communications channel, or channel, means a frequency band, e.g. a frequency.

The multichannel vehicle communications system 100 comprises a vehicle 101, a datalink system 102, a vehicle traffic control center (VTC) 104 (e.g. an air traffic control center), and a vehicle operations center (VOC) 106 (e.g. an airline operations center). In one embodiment, the datalink system 102 is a terrestrial system. The vehicle 101 includes a communications management system 108 (CMS; also known as a communications management unit) coupled to a multichannel transceiver 110. The multichannel transceiver 110 is configured to simultaneously (a) receive on at least two channels and (b) transmit on at least one channel. In another embodiment, the multichannel transceiver 110 receives on a second channel, while alternating between simultaneously receiving or transmitting on a first channel. In a further embodiment, the channels are in the VHF band; alternatively the channels may be in other bands. In yet another embodiment, as will be further exemplified, the vehicle traffic center 104 and vehicle operations center 106 are coupled through the same or different datalink network systems to both the first datalink transceiver station 114A and the second datalink transceiver station 114B, and e.g. thus to the vehicle 101.

The vehicle 101, e.g. the multichannel transceiver 110, is coupled to the datalink system 102 by at least two communications links, e.g. a first communications link 112A and a second communications link 112B, corresponding to two different channels. Although, two communications links 112A and 112B are illustrated in FIG. 1 and described elsewhere herein, more than two communications links may be used. The multichannel transceiver 110, and hence the corresponding communications links 112, may be a HF, VHF, satellite, cellular network, Wi-Fi, Wi-Max, and/or AeroMACs transceiver and corresponding communications links.

Data is communicated between the vehicle 101 and the vehicle traffic control center 104 and the vehicle operations center 106 through the datalink system 102. For example, for aircraft, the datalink system 102 includes datalink transceiver stations and datalink networks, e.g. part of Rockwell Collins' ARINC network and/or SITA's network. In one embodiment, the datalink system 102 may communicate using an aircraft communications addressing and reporting system (ACARS) protocol, and/or an aeronautical telecommunication network (ATN)/open system interconnection (OSI) and/or an Internet Protocol (IP) protocols.

In one embodiment, the vehicle 101 can communicate with the vehicle traffic control center 104 and/or the vehicle operations center 106 through at least two different network service providers. For example, the at least one datalink network system 116 comprises two datalink network systems each of which are operated by different service providers. Each datalink network system is coupled to a unique datalink transceiver station which is also operated by the corresponding service provider. In another embodiment, each datalink network system is coupled to both the vehicle traffic control center 104 and the vehicle operations center 106. Alternatively, in a further embodiment, the vehicle traffic control center 104 and the vehicle operations center 106 are each uniquely coupled to one of the datalink transceiver stations.

The datalink system 102 includes at least one datalink transceiver station (e.g. a ground datalink transceiver station or ground transceiver station that forms a communications link with the vehicle 101 such as an aircraft) coupled to at least one datalink network system 116. FIG. 1 illustrates one embodiment of a datalink system 102 including a first datalink transceiver station 114A and a second datalink transceiver station 114B each coupled to the at least one datalink network system 116. In another embodiment, each datalink transceiver station includes a radio transceiver configured to transmit and receive data respectively to and from the vehicle 101. In a further embodiment, the at least one datalink network system 116 is a ground network which routes data between the vehicle 101, and the vehicle traffic control center 104 and/or the vehicle operations center 106.

In one embodiment, the first datalink transceiver station 114A and the second datalink transceiver station 114B are operated by the same or different service providers, e.g. Rockwell Collins and/or SITA. In another embodiment, the first datalink transceiver station 114A and the second datalink transceiver station 114B operate on different channels, e.g. frequencies, even if operated by the same service provider.

In one embodiment, each datalink network system includes one or more routers to facilitate the routing of such data between vehicles, and the vehicle traffic center 104 and/or vehicle operations center 106. In another embodiment, the one or more routers include an ACARS router, an ATN/OSI router, and/or an IP router such as an ATN/IP router. In a further embodiment, each datalink network system includes one or more communications links that couple the datalink network system to at least one datalink transceiver station, the vehicle traffic center 104 and/or the vehicle operations center 106.

The datalink system 102 including a first datalink transceiver station 114A, a second datalink transceiver station 114B, and at least one datalink network system 116. Thus, the at least one datalink network system 116 can be a one, two, three, or more datalink networks. In one embodiment, the datalink system 102 includes three or more datalink transceiver stations.

Figure 2:
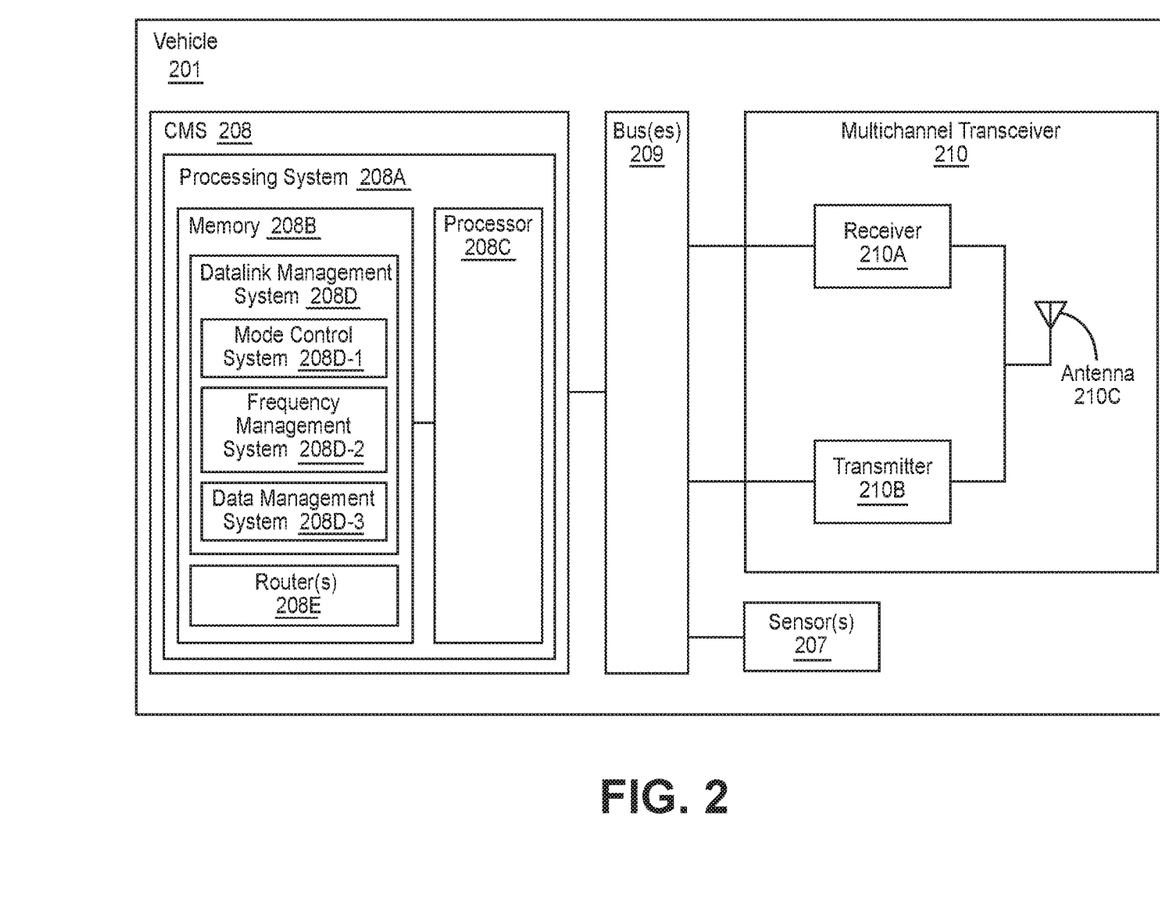
FIG. 2 illustrates one embodiment of a method for analyzing vehicle systems during vehicle travel.

FIG. 2 illustrates one embodiment of a vehicle 201 including a multichannel transceiver 210. The vehicle 201 comprises the communications management system (CMS) 208 coupled to the multichannel transceiver 210. In another embodiment, the communications management system 208 is coupled to the multichannel transceiver 210 by at least one bus 209, e.g. a data bus. In another embodiment, the at least one bus 209 is one or more ARINC 429 buses.

In one embodiment, the vehicle 201 includes at least one sensor 207 which may be an inertial management unit and/or a global satellite navigation system, e.g. GPS, receiver. In another embodiment, the at least one sensor 207 is coupled to the communications management system 208, e.g. through the at least one bus 209.

In one embodiment, the multichannel transceiver 210 includes a receiver 210A and transmitter 210B coupled to an antenna 210C. The receiver 210A and the transmitter 210B may be coupled to the antenna 210C in different ways, e.g. to reduce interference in the receiver 210B from simultaneous transmission by the transmitter 210B. In another embodiment, the antenna 210C may comprise a transmit antenna and a receive antenna which are respectively coupled to the transmitter 210B and the receiver 210A. Alternatively or in addition, a portion of a transmission signal and/or wideband noise generated by the transmitter 210B may be fed back to an interference canceller in the receiver 210A to suppress interference arising from the transmission signal an/or the wideband noise.

In one embodiment, the receiver 210A, or the receiver 210A and the transmitter 210B, are software defined radios. In another embodiment, the software defined radio receiver includes a low noise amplifier coupled to an analog to digital converter (ADC); the ADC is coupled to a digital signal processor (DSP). In a further embodiment, the software defined radio transmitter includes a DSP coupled to a digital to analog converter (DAC); the DAC is coupled to a power amplifier. In yet another embodiment, a software defined radio receiver and transmitter share a common DSP.

The multichannel transceiver 210 is configured to simultaneously receive communications in two or more channels, e.g. corresponding to two or more communications links. In one embodiment, the multichannel transceiver 210 is also configured to transmit over a single channel, e.g. one communications link, at any time while simultaneously receiving one or more communications channels. In another embodiment, if the power amplifier is linear enough to avoid creating interference, e.g. intermodulation distortion products, the multichannel transceiver 210 is also configure to transmit two or more channels simultaneously, even while the receiver 210A is receiving on other channels. In a further embodiment, the power amplifier can be linearized by using pre-distortion.

In one embodiment, the communications management system 208 comprises a processing system 208A. In another embodiment, the processing system 208A includes a memory 208B coupled to a processor 208C. In a further embodiment, the memory 208B includes a datalink management system 208D. In yet another embodiment, the datalink management system 208D includes a mode control system 208D-1, a frequency management system 208D-2, and a data management system 208D-3.

In one embodiment, the processor 208C and memory 208B comprise in whole or in part a state machine or a field programmable gate array. In another embodiment, the datalink management system 208D, including its constituents, is software stored in the memory 208B that is executed by the processor 208C.

In one embodiment, the communications management system 208 routes messages through at least one datalink system 102 between components of the vehicle 101, and the VTC 104 and VOC 106. Vehicle components including the communications management system 208 itself and other components such as travel management system (or flight management system for aircraft) and a central maintenance computer.

In yet a further embodiment, the communications management system 208 includes at least one router 208E which performs the routing function in the communications management system 208. In one embodiment, the at least one router 208E includes an ACARS router, an ATN/OSI router, and/or an IP router such as an ATN/IP router. In another embodiment, the communications management system 208 controls and sets the frequencies, e.g. of the channels to facilitate reception and transmission, of the multichannel transceiver 210; in other words, the communications management system 208 controls the channels used by the multichannel transceiver 210.

In one embodiment, the datalink management system 208D provides mode control, frequency management and data management services as shall be further described. In another embodiment, the datalink management system 208D selects at least one datalink network system and at least one datalink transceiver station through which to send and receive data, e.g. messages, respectively to and from a vehicle traffic control center 104 and/or a vehicle operations center 106. In a further embodiment, the datalink management system 208D selects the at least one datalink network system and the at least one datalink transceiver station based on cost (e.g. costs of different service providers), communications link availability, communications link performance, datalink security, ability to communicate vehicle traffic control safety service messages, instructions from a service provider, and/or other factors, e.g. as described elsewhere herein.

The mode control system 208D-1 determines the mode of operation of the multichannel transceiver 210, e.g. voice or data, and/or the corresponding modulation format. In another embodiment, the mode control system 208D-1 also determines the rate at which data is send and received by the multichannel transceiver 210. In a further embodiment, for a VHF radio, the data modes include Mode A, and Mode 2 which operates at a higher data rate of 32 kbps.

In one embodiment, the frequency management system 208D-2 determines the frequencies or channels through which the multichannel transceiver receives and/or transmits, e.g. through at least one datalink system 102 to a vehicle traffic control center 104 and a vehicle operations center 106. In another embodiment, the frequency management system 208D-2 stores different sets of frequencies, for different geographic regions, used to communicate with ground datalink stations coupled to vehicle traffic control centers 104 and vehicle operations centers 106.

In one embodiment, the data management system 208D-3 determines which communications links 112 and datalink network system(s) 116 will be used to transmit and receive messages from vehicle traffic control centers 104 and vehicle operations centers 106. The data management system 208D-3 also assembles and dissembles messages based on industry standards, e.g. ARINC 618, including into blocks or Internet Protocol packets.

In one embodiment, the data management system 208D-3 determines the geographic location of the vehicle 201 from the at least one sensor 207. In another embodiment, the data management system 208D-3 selects the at least one datalink network system and the at least one datalink transceiver station in the geographic region based upon, e.g., the factors described above with regards to the selection of the at least one datalink network system and the at least one datalink transceiver station. In a further embodiment, the data management system 208D-3 provides geographic region, the selected at least one datalink network system, and/or the selected at least one datalink transceiver station to the frequency management system 208D-2. In yet another embodiment, the frequency management system 208D-2 selects the corresponding set of frequencies for the selected at least one datalink network system and the at least one datalink transceiver station based upon the geographic region, the selected at least one datalink network system, and/or the selected at least one datalink transceiver station. In another embodiment, the frequency management system 208D-2 then commands the multichannel transceiver 210 to tune to the selected set of frequencies to communicate with the selected at least one datalink network system and the at least one datalink transceiver station. For example, the frequency management system 208D-2 commands the receiver 210A to receive signals on two channels (or frequencies) respectively corresponding to a vehicle traffic control center 104 (and a first datalink transceiver station 114A) and a vehicle operations center 106 (and a second datalink transceiver station 114B); the frequency management system 208D-2 tunes the transmitter 210B to either the frequency corresponding to the vehicle traffic control center 104 or the vehicle operations center 106 depending upon to which end point the multichannel transceiver 210 is transmitting.

In one embodiment, the multichannel transceiver 210 is used to establish at least two channels with the vehicle traffic control center 104 and the vehicle operations center 106 through at least two communications links, at least two datalink transceiver stations, and at least one datalink network system 116. In this embodiment, data, e.g. messages, are transmitted to and received from both the vehicle traffic control center 104 and the vehicle operations center 106 over the first channel and first communications link 112A. Until commanded otherwise, the transmitter 210B transmits to the first datalink transceiver station 114A through the first communications channel 112A. The second channel and second communications link 112B also permits transmission to and reception from both the vehicle traffic control center 104 and the vehicle operations center 106, but are backups only used in the event communications are disrupted over the first channel and the first communications link 112A. Such disruption may occur when the vehicle 101 leaves the operating range of the first datalink transceiver station 114A, because the first datalink transceiver station 114A becomes disabled, or because an interfering signal makes transmission to or reception from the first datalink transceiver station 114A unreliable.

In one embodiment, if the communications management system 208, e.g. the datalink manager 208D, detects such disrupted communications, e.g. due to no acknowledgements for messages being received, then the communications management system 208 commands the transmitter 210B to alter its frequency of transmission from a frequency of the first communications link 114A to a frequency of the second communications link 114B. Further, the receiver 210A and communications management system 208 will begin utilizing data, e.g. messages, received through the second communications channel and the second communications link 114B. In another embodiment, the communications management system 208 then selects a new first channel and first communications link 114A to serve as a backup for the second channel and second communications link 114A which have become the primary channel and communications link.

In one embodiment, the multichannel transceiver 210 is used to establish at least two communications links 112 with at least two datalink transceiver stations, at least one datalink system 116, and the vehicle traffic control center 104 and the vehicle operations center 106. In this embodiment, messages are transmitted to and received from both the vehicle traffic control center 104 and the vehicle operations center 106 respectively over a first communications channel and the first communications link 112A, and a second channel and the second communications link 112B. Thus, the first datalink transceiver station 114A transmits and receives messages to and from the vehicle traffic control center 104 over the first channel and the first communications link 112A; the second datalink transceiver station 114B transmits and receives messages to and from the VOC 106 over the second channel and the second communications link 112B. In this embodiment, the receiver 210A simultaneous receives and processes messages received over the first communications link 112A and the second communications link 122B. The transmitter 210B transmits messages through the first communications link 112A and the second communications link 122B one communications link at a time. This approach has the benefit of reducing message congestion on each of the communications links, and effectively increasing communications bandwidth.

In one embodiment, the multichannel transceiver 210 receives information simultaneously from one or both of the vehicle traffic control center 104 and the vehicle operations center 106 over both the first communications link 112A and a first channel, and the second communications link 112B and the second channel. This approach also has the benefit of reducing message congestion, and effectively increasing communications bandwidth.

Figure 3:
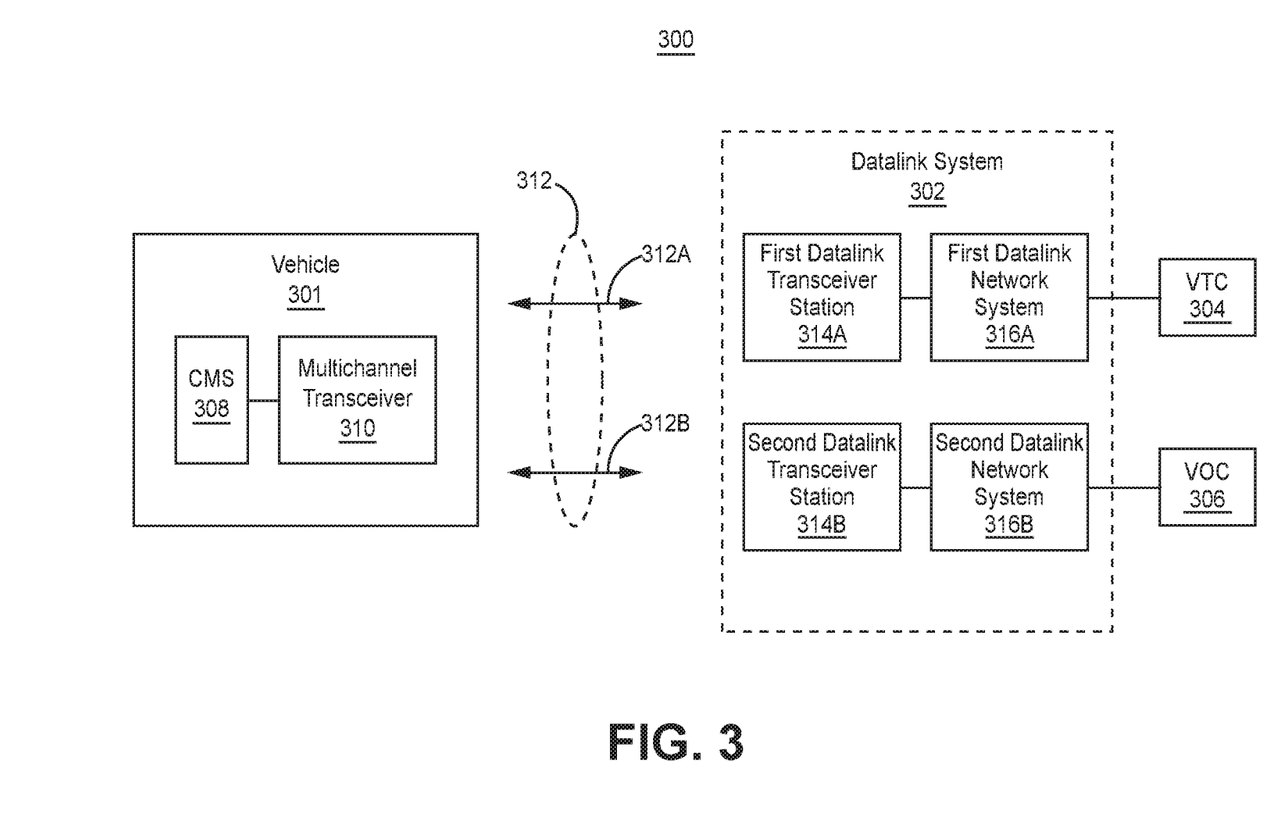
FIG. 3 illustrates another embodiment of a multichannel vehicle communications system.

FIG. 3 illustrates another embodiment of a multichannel vehicle communications system 300. The multichannel vehicle communications system 300 is configured to be able to simultaneously receive communications over two or more communications links. In one embodiment, the multichannel vehicle communications system 300 is also configured to transmit over a communications link while receiving over one or more other communications links.

The multichannel vehicle communications system 300 comprises a vehicle 301, a datalink system 302, a vehicle traffic control center (VTC) 304 (e.g. an air traffic control center), and a vehicle operations center (VOC) 306 (e.g. an airlines operations center). The vehicle 301 includes a communications management system 308 coupled to a multichannel transceiver 310. The vehicle 301 is coupled the datalink system 302 by at least two communications links, e.g. a first communications link 312A and a second communications link 312B. Although, two communications links 312A and 312B are illustrated in FIG. 3 and described elsewhere herein, more than two communications links may be used. Each communications link may be a HF, VHF, satellite, cellular network, Wi-Fi, Wi-Max, an AeroMACs, and/or any other communications links.

The datalink system 302 includes at least two datalink transceiver stations (e.g. ground datalink transceiver station or ground transceiver station each of which forms a communications link between the vehicle 301 and a datalink network system. FIG. 3 illustrates one embodiment of a datalink system 302 including a first datalink transceiver station 314A and a second datalink transceiver station 314B each of which is respectively coupled to a first datalink network system 316A and a second datalink network system 316B. However, the datalink system 302 can include more than two pairs of datalink transceiver stations and datalink network systems. In another embodiment, each datalink transceiver station includes a radio transceiver configured to transmit and receive data from the vehicle 301. In a further embodiment, each datalink network is a ground network which routes data to and from the vehicle 301 to the vehicle traffic control center 304 and/or the vehicle operations center 306. Each datalink network includes one or more routers to facilitate the routing of such data.

In this embodiment, the receiver 210A is simultaneously coupled (a) through the first communications link 312A to the first datalink transceiver station 314A, the first datalink network system 316A, and the vehicle traffic control center 304, and (b) through the second communications link 312B to the second datalink transceiver station 314B, the second datalink network system 316B, and the vehicle operations center 306. In another embodiment, the transmitter 210B transmits on the frequenc(ies) of the first channel. Upon the first communications link 312A becoming disrupted, the communications management system 308 commands the multichannel transceiver 310 to re-establish another communications link via different frequenc(ies) for the first channel while continuously transmitting and receiving on the frequenc(ies) of the second channel.

Figure 4:
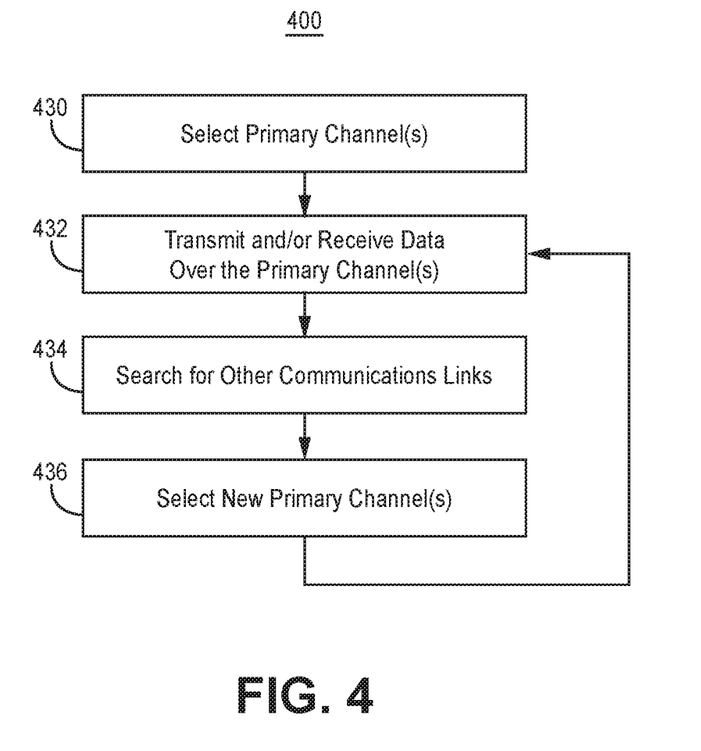
FIG. 4 illustrates one embodiment of a method for utilizing a multichannel transceiver to maintain communications with a vehicle operations center and/or a vehicle traffic center.

FIG. 4 illustrates one embodiment of a method 400 for utilizing a multichannel transceiver to maintain communications with a vehicle traffic center and/or a vehicle operations center. To the extent that the embodiment of method 400 shown in FIG. 4 is described herein as being implemented in the systems shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 430, select a primary receive channel and a primary transmit channel, e.g. with a communications management system 108 of a multichannel transceiver 110 in a vehicle 101 that corresponds to a primary communications link coupling the vehicle 101 with a vehicle traffic control center 104 and/or a vehicle operations center 106 through a first datalink transceiver station 114A of at least one datalink system 102. In one embodiment, the primary receive channel and the primary transmit channel may be the same channel and thus on the same frequenc(ies). In another embodiment, the primary receive channel and the primary transmit channel are different channels and are on different frequencies. In a further embodiment, the primary receive channel and the primary transmit channel are selected based upon the geographic location of the vehicle 101; the signal strength of the signals on a channel received by the vehicle 101 from the at least one datalink network 102 and/or received by the at least one datalink network 102 from the vehicle 101; operational cost of a relay network system; instructions received from a service provider, and/or any other factor, e.g. the factors described above with regards to the selection of the at least one datalink network system and the at least one datalink transceiver station. In block 432, transmit and receive data, e.g. messages, between the vehicle 101 and the vehicle traffic control center 104 and/or the vehicle operations center 106 over the primary channel(s). In one embodiment, transmit and receive data using the multichannel transceiver 110. In another embodiment, send messages in ACARS, ATN/OSI and/or ATN/IP formats.

In block 434, scan, e.g. with the multichannel transceiver 110, other receive channels searching from other viable communications links coupled to the vehicle traffic control center 104 and/or the vehicle operations center 106 that have better signal characteristics then the primary communications link. Viable communications links are communications links that can be used to facilitate communications with the vehicle traffic center 104 and/or the vehicle operations center 106. In one embodiment, the signal characteristic is a signal to noise ratio (SNR) and/or a received signal strength indicator (RSSI).

In block 436, select new primary channel(s) for the multichannel transceiver 110, e.g. with the communications management system 108. In one embodiment select new channel(s) based upon the new channel(s) corresponding to a new communications link having a signal characteristic better than the primary communications link, the new communications link has a signal characteristic better than a first threshold level, and/or the primary communications link having a signal characteristic below a second threshold level. In another embodiment, the threshold levels may be SNR and/or RSSI levels. In a further embodiment, communicate over both the original primary channel(s) and the new primary channel(s). Then, return to block 434.

EXAMPLE EMBODIMENTS

Example 1 includes a system, comprising: a multichannel transceiver configured to be installed in a vehicle and to simultaneously receive on at least two channels; wherein the multichannel transceiver is configured to communicate through a datalink system with at least one of a vehicle traffic center and a vehicle operations center; a communications management system coupled to the multichannel transceiver; wherein the communications management system is configured to be installed in a vehicle; and wherein the communications management system is configured to control the channels of the multichannel transceiver, and relay data between vehicle components and the at least one of a vehicle traffic center and the vehicle operations center.

Example 2 includes the system of Example 1, wherein the multichannel transceiver is configured to be coupled, through a first communications link over a first channel and through a second communications link over a second channel, to a datalink system, where the datalink system comprises: at least one datalink network system; a first datalink transceiver station coupled to the first communications link, and to at least one of the vehicle traffic center and the vehicle operations center through the at least one datalink network system; a second datalink transceiver station coupled to the second communications link, and to the at least one of the vehicle traffic center and the vehicle operations center through the at least one datalink network system; wherein the communications management system is configured to select the first communications link to facilitate communications between the multichannel transceiver and the at least one of the vehicle traffic center and the vehicle operations center; and wherein the communications management system is configured to select the second communications link when communications over the first communications link becomes disrupted.

Example 3 includes the system of any of Examples 1-2, wherein the multichannel transceiver is configured to be coupled through a first communications link over a first channel and through a second communications link over a second channel, to a datalink system, where the datalink system comprises: at least one datalink network system; a first datalink transceiver station coupled to the first communications link, and to a vehicle traffic center through the at least one datalink network system; and a second datalink transceiver station coupled to the second communications link, and to a vehicle operations center through the at least one datalink network system.

Example 4 includes the system of any of Examples 1-3, wherein the multichannel transceiver is configured to be coupled through a first communications link over a first channel and through a second communications link over a second channel, to a datalink system, where the datalink system comprises: at least one datalink network system a first datalink transceiver station coupled to the first communications link, and to a vehicle traffic center and a vehicle operations center through the at least one datalink network system; and a second datalink transceiver station coupled to the second communications link, and to a vehicle traffic center and a vehicle operations center through the at least one datalink network system.

Example 5 includes the system of Example 4, wherein if either the first communications link or the second communications link becomes disrupted, the multichannel transceiver is configured to remain in communications with the vehicle traffic center and the vehicle operations center.

Example 6 includes the system of any of Examples 1-5, wherein the multichannel transceiver comprises a software defined radio.

Example 7 includes the system of any of Examples 1-6, further comprising at least one bus coupling the communications management system to the multichannel transceiver.

Example 8 includes the system of any of Examples 1-7, wherein the communications management system is configured to be coupled to at least one of an inertial management system and a global navigation satellite system receiver.

Example 9 includes a communications management system, comprising: a processing system; a router coupled to the processing system; wherein the communications management system is configured to be installed in a vehicle and to be coupled to a multichannel transceiver, in the vehicle, configured to simultaneously receive on at least two channels simultaneously; and wherein the processing system is configured to control the channels of the multichannel transceiver, and relay data between components in the vehicle and at least one of a vehicle traffic center and a vehicle operations center.

Example 10 includes the communications management system of Example 9, wherein the router comprises at least one of an aircraft communications addressing and reporting system (ACARS) router, an aeronautical telecommunication network (ATN)/open system interconnection (OSI) router, and an Internet Protocol (IP) router such as an ATN/IP router.

Example 11 includes the communications management system of any of Examples 9-10, wherein the processing unit comprises: a processor; a memory coupled to the processor; and wherein the memory comprises: a mode control system; a frequency management system; and a data management system.

Example 12 includes the communications management system of any of Examples 9-11, wherein initial frequencies of operation are determined based upon at least one of (a) geographic location; (b) received signal strength; (c) cost; (d) instructions from a service provider, (e) communications link availability, (f) communications link performance, (g)

datalink security, and (h) ability to communicate vehicle traffic control safety service messages.

Example 13 includes the communications management system of any of Examples 9-12, wherein the communications management unit is configured to control the multichannel transceiver to be coupled, through a first communications link over a first channel and through a second communications link over a second channel, to a datalink system, where the datalink system comprises: a first datalink transceiver station coupled to the first communications link, and to at least one of the vehicle traffic center and the vehicle operations center through at least one datalink network system; a second datalink transceiver station coupled to the second communications link, and to the at least one of the vehicle traffic center and the vehicle operations center through the at least one datalink network system; and the at least one datalink network system; wherein the communications management system is configured to select the first communications link to facilitate communications between the multichannel transceiver and the at least one of the vehicle traffic center and the vehicle operations center; and wherein the communications management system is configured to select the second communications link when communications over the first communications link becomes disrupted.

Example 14 includes the communications management system of any of Examples 9-13, wherein the communications management unit is configured to control the multichannel transceiver to be coupled to a first communications link and a second communications link; wherein the first communications link is coupled to a first datalink transceiver station; wherein the second communications link is coupled to a second datalink transceiver station; wherein the first datalink transceiver station and the second datalink transceiver station are each coupled to at least one datalink network system; wherein at least one datalink network system is coupled to the vehicle traffic center and the vehicle operations center; wherein the vehicle traffic center is coupled to the multichannel transceiver through the first datalink transceiver station; and wherein the vehicle operations center is coupled to the multichannel transceiver through the second datalink transceiver station.

Example 15 includes the communications management system of any of Examples 9-14, wherein the communications management unit is configured to control the multichannel transceiver to be coupled through a first communications link over a first channel and through a second communications link over a second channel, to a datalink system, where the datalink system comprises: a first datalink transceiver station coupled to the first communications link, and to a vehicle traffic center and a vehicle operations center through at least one datalink network system; a second datalink transceiver station coupled to the second communications link, and to a vehicle traffic center and a vehicle operations center through the at least one datalink network system; and the at least one datalink network system.

Example 16 includes the system of any of Examples 9-15, wherein if either the first communications link or the second communications link becomes disrupted, the multichannel transceiver is configured to remain in communications with the vehicle traffic center and the vehicle operations center.

Example 17 includes the system of any of Examples 9-16, wherein the communications management system is configured to be coupled to at least one of an inertial management system and a global navigation satellite system receiver.

Example 18 includes a method, comprising: selecting, with a communications management system configured to be installed on a vehicle, at least one primary channel on a multichannel transceiver; at least one of transmitting and receiving data over the at least one primary channel; searching, with the multichannel transceiver for other viable communications links; and selecting a new at least one primary channel.

Example 19 includes the method of Example 18, wherein the selecting at least one primary channel comprises selecting a new primary channel based upon at least one of: signal strength of the signals received, geographic location; cost, instructions from a service provider, communications link availability, datalink security, and ability to communicate vehicle traffic control safety service messages.

Example 20 includes the method of any of Examples 18-19, wherein the selecting the new at least one primary channel comprises selecting a new primary channel based upon at least one of: a communications link corresponding to the new primary channel having a signal characteristic better than a communications link of the primary channel, the communications link corresponding to the new primary channel having a signal characteristic better than a first threshold level, the communications link corresponding to the primary channel having a signal characteristic below a second threshold level, geographic location; cost, instructions from a service provider, communications link availability, datalink security, and ability to communicate vehicle traffic control safety service messages.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   a multichannel transceiver, comprising only one transmitter, configured to be installed in a vehicle and to simultaneously receive on at least two channels;
   wherein the multichannel transceiver is configured to communicate through a datalink system with at least one of a vehicle traffic center and a vehicle operations center;
   a communications management system coupled to the multichannel transceiver;
   wherein the communications management system is configured to be installed in the vehicle; and
   wherein the communications management system is configured to select channels from a plurality of channels of the multichannel transceiver, and relay data between at least one vehicle component and the at least one of the vehicle traffic center and the vehicle operations center.

2. The system of claim 1, wherein the multichannel transceiver is configured to be coupled, through a first communications link over a first channel and through a second communications link over a second channel, to the datalink system, where the datalink system comprises:
   at least one datalink network system;
   a first datalink transceiver station coupled to the first communications link, and to at least one of the vehicle traffic center and the vehicle operations center through the at least one datalink network system;
   a second datalink transceiver station coupled to the second communications link, and to the at least one of the vehicle traffic center and the vehicle operations center through the at least one datalink network system;

wherein the communications management system is configured to select the first communications link to facilitate communications between the multichannel transceiver and the at least one of the vehicle traffic center and the vehicle operations center; and wherein the communications management system is configured to select the second communications link when communications over the first communications link becomes disrupted.

3. The system of claim 1, wherein the multichannel transceiver is configured to be coupled through a first communications link over a first channel and through a second communications link over a second channel, to the datalink system, where the datalink system comprises:
   at least one datalink network system;
   a first datalink transceiver station coupled to the first communications link, and to the vehicle traffic center through the at least one datalink network system; and
   a second datalink transceiver station coupled to the second communications link, and to the vehicle operations center through the at least one datalink network system.

4. The system of claim 1, wherein the multichannel transceiver is configured to be coupled through a first communications link over a first channel and through a second communications link over a second channel, to the datalink system, where the datalink system comprises:
   at least one datalink network system;
   a first datalink transceiver station coupled to the first communications link, and to the vehicle traffic center and the vehicle operations center through the at least one datalink network system; and
   a second datalink transceiver station coupled to the second communications link, and to the vehicle traffic center and the vehicle operations center through the at least one datalink network system.

5. The system of claim 4, wherein if either the first communications link or the second communications link becomes disrupted, the multichannel transceiver is configured to remain in communications with the vehicle traffic center and the vehicle operations center.

6. The system of claim 1, further comprising at least one bus coupling the communications management system to the multichannel transceiver.

7. The system of claim 1, wherein the transmitter is configured to be coupled to a single antenna.

8. A communications management system, comprising:
   a processing system;
   a router coupled to the processing system;
   wherein the communications management system is configured to be installed in a vehicle and to be coupled to a multichannel transceiver, comprising only one transmitter, in the vehicle, configured to simultaneously receive on at least two channels simultaneously; and
   wherein the processing system is configured to select channels from a plurality of channels of the multichannel transceiver, and relay data between at least one component in the vehicle and at least one of a vehicle traffic center and a vehicle operations center.

9. The communications management system of claim 8, wherein the router comprises at least one of an aircraft communications addressing and reporting system (ACARS) router, an aeronautical telecommunication network (ATN)/open system interconnection (OSI) router, and an Internet Protocol (IP) router such as an ATN/IP router.

10. The communications management system of claim 8, wherein the processing unit comprises:
    a processor;
    a memory coupled to the processor; and
    wherein the memory comprises:
       a mode control system;
       a frequency management system; and
       a data management system.

11. The communications management system of claim 8, wherein initial frequencies of operation are determined based upon at least one of (a) geographic location; (b) received signal strength; (c) cost; (d) instructions from a service provider, (e) communications link availability, (f) communications link performance, (g) datalink security, and (h) ability to communicate vehicle traffic control safety service messages.

12. The communications management system of claim 8, wherein the communications management unit is configured to control the multichannel transceiver to be coupled, through a first communications link over a first channel and through a second communications link over a second channel, to a datalink system, where the datalink system comprises:
    a first datalink transceiver station coupled to the first communications link, and to at least one of the vehicle traffic center and the vehicle operations center through at least one datalink network system;
    a second datalink transceiver station coupled to the second communications link, and to the at least one of the vehicle traffic center and the vehicle operations center through the at least one datalink network system; and
    the at least one datalink network system;
    wherein the communications management system is configured to select the first communications link to facilitate communications between the multichannel transceiver and the at least one of the vehicle traffic center and the vehicle operations center; and
    wherein the communications management system is configured to select the second communications link when communications over the first communications link becomes disrupted.

13. The communications management system of claim 8, wherein the communications management unit is configured to control the multichannel transceiver to be coupled to a first communications link and a second communications link;
    wherein the first communications link is coupled to a first datalink transceiver station;
    wherein the second communications link is coupled to a second datalink transceiver station;
    wherein the first datalink transceiver station and the second datalink transceiver station are each coupled to at least one datalink network system;
    wherein at least one datalink network system is coupled to the vehicle traffic center and the vehicle operations center;
    wherein the vehicle traffic center is coupled to the multichannel transceiver through the first datalink transceiver station; and
    wherein the vehicle operations center is coupled to the multichannel transceiver through the second datalink transceiver station.

14. The communications management system of claim 8, wherein the communications management unit is configured to control the multichannel transceiver to be coupled through a first communications link over a first channel and through a second communications link over a second channel, to a datalink system, where the datalink system comprises:

a first datalink transceiver station coupled to the first communications link, and to the vehicle traffic center and the vehicle operations center through at least one datalink network system;

a second datalink transceiver station coupled to the second communications link, and to the vehicle traffic center and the vehicle operations center through the at least one datalink network system; and the at least one datalink network system.

15. The communications management system of claim 14, wherein if either the first communications link or the second communications link becomes disrupted, the multichannel transceiver is configured to remain in communications with the vehicle traffic center and the vehicle operations center.

16. The communication management system of claim 8, wherein the transmitter is configured to be coupled to a single antenna.

17. A method, comprising:

selecting, with a communications management system configured to be installed on a vehicle, at least one primary channel on a multichannel transceiver, comprising only one transmitter, coupled to the communications management system;

wherein the communications management system is further configured to relay data between at least one vehicle component and at least one of a vehicle traffic center and a vehicle operations center;

at least one of transmitting and receiving data, with the multichannel transceiver, over the at least one primary channel;

searching, with the multichannel transceiver, for other viable communications links; and selecting a new at least one primary channel on the multichannel transceiver.

18. The method of claim 17, wherein the selecting at least one primary channel comprises selecting a new primary channel based upon at least one of: signal strength of the signals received, geographic location; cost, instructions from a service provider, communications link availability, datalink security, and ability to communicate vehicle traffic control safety service messages.

19. The method of claim 17, wherein the selecting the new at least one primary channel comprises selecting a new primary channel based upon at least one of: a communications link corresponding to the new primary channel having a signal characteristic better than a communications link of the primary channel, the communications link corresponding to the new primary channel having a signal characteristic better than a first threshold level, the communications link corresponding to the primary channel having a signal characteristic below a second threshold level, geographic location; cost, instructions from a service provider, communications link availability, datalink security, and ability to communicate vehicle traffic control safety service messages.

20. The method of claim 17, wherein the transmitter is configured to be coupled to a single antenna.

\* \* \* \* \*